Oct. 17, 1961  M. M. MAIN  3,004,780
TEFLON HOSE FITTING
Filed Nov. 26, 1956

INVENTOR.
Merrill M Main
BY Charles F. Vojtech
Attorney ered Oct. 17, 1961

3,004,780
TEFLON HOSE FITTING
Merrill M. Main, Park Ridge, Ill., assignor to Crane Packing Company, Morton Grove, Ill., a corporation of Illinois
Filed Nov. 26, 1956, Ser. No. 624,337
1 Claim. (Cl. 285—242)

The present invention relates to couplings for conduits and has particular reference to a pipe type connector or fitting whereby the adjacent open ends of two tubular members may be operatively connected together in sealed relationship for free unobstructed flow of fluid within and between the conduits, or whereby the open end of a single conduit may be similarly connected to a fluid port leading from or extending to a fluid reservoir, chamber or the like.

The invention has been designed for use primarily in connection with high temperature, moderate pressure installations involving the flow of chemical solutions, suspensions, mixtures and the like, particularly those of a caustic or corrosive nature and wherein the tubular members involved are designed to withstand the deleterious effects of such fluids, and which, toward this end, are formed of polytetrafluoroethylene polymer.

Conduits formed of polytetrafluoroethylene polymer present sealing, anchoring and other physical problems quite different from those which are encountered in conduits when they are formed of the more common materials such as rubber, rubberized fabric and similar plastic materials possessing a high degree of resiliency. Polytetrafluoroethylene polymer manufactured by E. I. du Pont de Nemours & Company under the trade name "Teflon" is characterized by its chemical inertness through a range of temperatures extending from extremely low temperatures up to approximately 570° F. "Teflon" is insoluble in all of the more common substances and no reaction has been noted with the destructive type such as the halogenated hydrocarbons, chlorosulfonic acid acetyl chloride, boron trisulfide and other high boiling point solvents at their boiling points.

The chemical inertness of "Teflon" renders it ideal for use as a conduit-forming material for chemical fluids. Physically, however, while it has adequate toughness and is possessed of good tensile strength, it lacks many of those characteristics such as immediate-response resiliency, a requisite high static coefficient of friction, ease of compressibility and resistance to cold flow which are relied upon to effect a dependable seal when conventional coupling devices having threaded parts are employed at the ends of the conduits.

The present invention is designed to overcome the above-noted limitations that are attendant upon the use of conventional pipe couplings and which render them incapable of use with conduits formed of "Teflon" and other plastic materials which may lack these desirable and, in fact, necessary qualities. Toward this end, the invention contemplates the provision of a coupling device which utilizes to good advantage the very features outlined above which render conventional coupling devices unfit for use with "Teflon" and other plastic tubing having similar physical deficiencies, and, by virtue of them provides an effective seal against the escape of fluid through the joint effected thereby.

A specific yet important object of this invention is to provide a coupling wherein the end region of the conduit itself constitutes one of the sealing elements associated with the coupling and wherein its inherent resistance to compressional forces, ordinarily a limitation on the sealing factor, contributes toward the provision of an effective coupling seal.

Another important object of this invention, in a fluid coupling for conduits of "Teflon" and similar plastic substances, is to provide a connector which is characterized by the absence of circular sealing gaskets and similar extraneous annular packing devices which ordinarily require special installation procedure and periodic inspection, adjustment or replacement.

A still further object of this invention is to provide a coupling of the character briefly outlined above which, at the time of installation, as well as throughout the life of the coupling, is self-aligning and self-adjusting so that little or no attention need be given it after the initial installation has been made.

Other objects and advantages of the invention, not at this time enumerated, will become more readily apparent as the following description ensues.

In the accompanying single sheet of drawings forming a part of this specification, a preferred embodiment of the invention has been shown.

Figure 1:
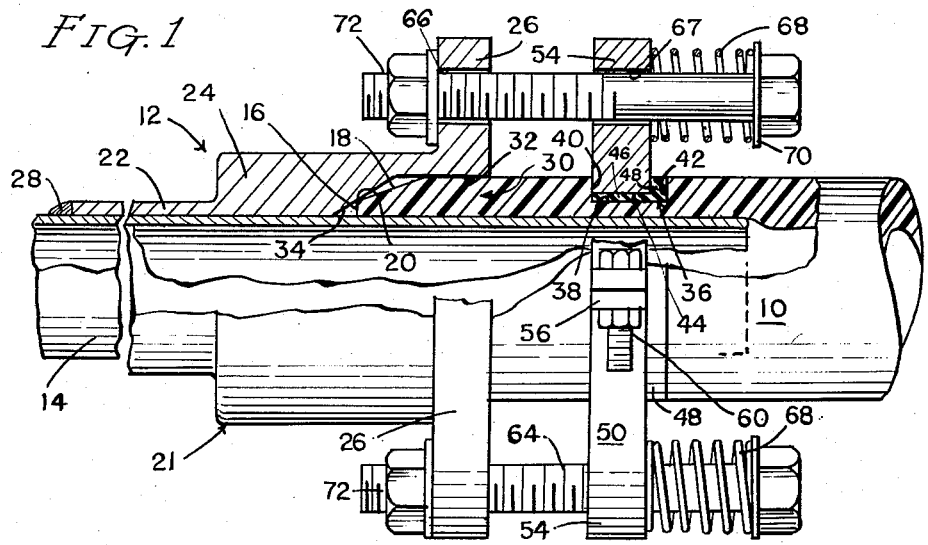
FIG. 1 is a side elevational view, partly in section, of a fluid coupling constructed in accordance with the principles of the present invention and showing the same disposed in a typical installation.
Figure 2:
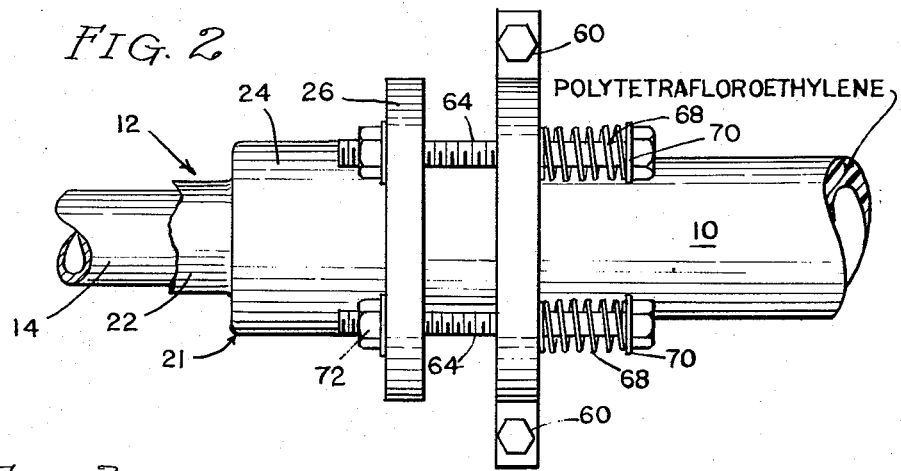
FIG. 2 is a plan view on a reduced scale of the structure shown in FIG. 1.

Referring now to the drawings in detail, the end region of a length of tubing, which may constitute one section of an elongated conduit, is designated in its entirety at 10. The tubing 10, for illustrative purposes, is described herein as being formed of polytetrafluoroethylene polymer known as "Teflon" and may be of either extruded or machined "Teflon" stock. The remainder of the structure illustrated in the drawings, designated in its entirety at 12, comprises the coupling of the present invention and is designed for use in establishing sealed communication between the open end of the conduit section of tubing 10 and a similarly open end of an adjacent section of tubing (not shown), or a fluid orifice, port or the like leading from a fluid reservoir or chamber.

The coupling 12 involves an elongated inner cylindrical sleeve 14 which is preferably formed of stainless steel and is of the thin wall variety. An appreciable extent of the sleeve 14 is received within the end of tubing 10 as best seen in FIG. 1, the connection between the parts being made with a slip fit which may be augmented, if desired, by a previous machining operation on the end of the tubing over sleeve 14. The coupling end of tubing 10 is formed with a flat annular radially extending surface 16 from the outer circular edge of which there extends outwardly a bevelled or frusto-conical surface 18 which defines with the aforementioned radial surface 16 a relatively sharp sealing edge 20 having a sealing function which will be made clear presently. The remote end of the sleeve 14 may be telescopically received within the end of an adjacent length or section of the "Teflon" tubing (not shown) which is to be joined in fluid communication to the section 10, or it may be disposed in sealing relation to a fluid orifice or port associated with a reservoir or other fluid chamber (not shown).

Surrounding the sleeve 14 and the end surface 16 of the tubing 10 is a metal coupling sleeve 21 including a relatively thin wall section 22, an intermediate relatively thick wall section 24 and a rear bolting flange section 26. The end of section 22 is welded as at 28 or is otherwise fixedly secured to inner sleeve 14, the weld 28 serving to assimilate axial thrust between sleeves 21 and 14 and to effect a fluid-tight seal between these sleeves. The coupling sleeve 21 is formed with a rearwardly facing recess 30 presenting a cylindrical wall 32 (FIG. 1) and a frusto conical bottom wall 34. The forward end of the tubing 10 is telescopically received within recess 30.

Figure 3:
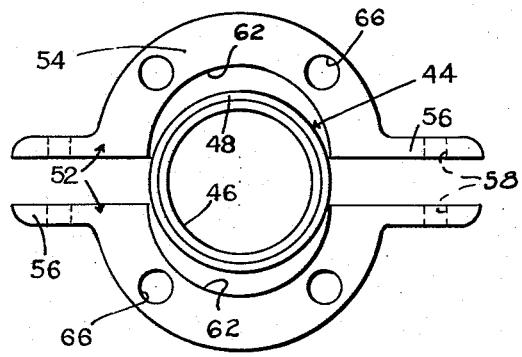
FIG. 3 is an expanded end elevational view of a composite sectional clamping collar employed in connection with the invention.

A continuous peripheral groove 36 is formed in the outer surface of the tubing 10 a small distance from the end of the tubing. Groove 36 has a cylindrical bottom wall 38 and radial front and rear side walls 40 and 42 respectively. Disposed within the groove 36 and seated on the bottom wall 38 thereof is a ring 44 which is preferably formed of silicone rubber and which therefore will withstand relatively high temperatures. Ring 44 is formed with a cylindrical portion 46 which is co-extensive with the width of the groove 36 and a radial flange portion 48 which terminates flush with the rim of the groove, these sections together forming an L. As shown in FIG. 3, ring 44 is continuous and is adapted to receive thereover a split clamping collar assembly 50 comprised of two sections 52 of identical configuration and each being formed with an arcuate cap portion 54 having outwardly and laterally projecting bolting or clamping flanges 56.

The adjacent clamping flanges 56 of the clamping sections 52 have aligned bolt holes 58 through which extends a pair of clamping bolts 60 by which the inner semi-cylindrical surfaces 62 of the two sections 52 may be drawn together over the cylindrical portion 46 of the L-ring 44 within the groove 36. When the sections are drawn together, the forward side of the collar assembly bears against the radial side 40 of the groove and the rear side thereof may bear against the forward face of the radial flange portion 48 of the L-ring 44.

Means are provided for normally and yieldingly urging the composite sectional clamping collar 50 bodily forwardly toward the outer sleeve 21 to urge in turn the forward end of the tubing 10 forwardly within the socket 30 to effect the desired sealing action between the tubing 10 and coupling sleeve 21. Accordingly, a series of through-bolts 64, preferably four in number, pass loosely through respective pairs of aligned holes 66 and 67 formed in the flange section 26 of the sleeve 21 and cap portions 54 of the collar assembly 50 respectively and are encircled by coil springs 68 which bear at one end against the rear sides of the clamping sections 52 and at the other end against washers 70 which in turn bear against the bolt heads. The threaded ends of the bolts 64 receive thereon clamping nut and washer assemblies 72 by which the compression of the springs 68 may be adjusted.

It is to be noted from an inspection of FIG. 1 that the slant angle of the bottom wall 34 of the recess 30 formed in the outer sleeve member 21 is less than the slant angle of the frusto conical bevelled surface 18 of the forward end of the tubing 10, these angles in the illustrated form of the invention being approximately 22½° and 30° respectively. These angles are, however, purely illustrative and other angles presenting a greater or a lesser angle differentiation may be employed if desired. Because of the fact that the slant angle of the surface 34 is less acute than that of the surface 20, pressure exerted by the forward end of the tubing 10 against the bottom wall of the recess 30 will effect a sealing action where the previously described sharp edge 20 engages the bottom wall. The forward movement of the end of the tubing section 10 into the recess or socket 30 effects a strong wedging action on the tapered end of the tubing between the inclined wall 34 and the outer surface of sleeve 14. This wedging action is augmented by the inherent resistance of the "Teflon" material to compressional forces, as well as by its low coefficient of friction, both static and sliding, which enables the forward end of the tubing 10, under the influence of the combined action of the springs 68, to move forwardly into the recess 30 with comparative ease unobstructed by the frictional resistance of either the cylindrical wall 32 or of the sloping bottom wall 34 of the recess 30. Any degree of cold flow or "creeping" which may take place within the "Teflon" material of the tubing 10 will, of course, be taken up by the expansion of the springs 68 so that once the coupling is placed in service it will function satisfactorily for an indefinite period of time without requiring attention.

Distortion of tubing 10 by clamping collar 50 is prevented by inner sleeve 14 which extends under and beyond the groove 36. It may be noted that tubing 10 has been weakened by the formation of groove 36 and might otherwise be deformed by the clamping collar. It may be noted further that silicone ring 46 serves as a cushion against radial pressures against the bottom of groove 36 which might be so great as to interfere with the axial movement of the tubing into sealing engagement with sleeve 21 in recess 30.

Sleeve 14 also provides support for tubing 10 against bending or misalignment with respect to coupling 12.

In compliance with Title 35, U.S. Code, Section 22, a preferred form of the invention has been shown in the accompanying drawings and described herein, but it should be understood that the invention is not limited to the specific disclosure made, and that the appended claim should be construed as broadly as the prior art will permit.

I claim:

A coupling device for connecting a hose of relatively stiff material to another hose or to a port, said coupling device comprising a rigid socket member connected to said other line or port and including an inner sleeve, an outer sleeve having one end sealed to the inner sleeve and its other end enlarged and separated from the inner sleeve to define an annular socket having a continuous conical bottom wall and cylindrical inner and outer walls, said hose having a frusto-conical end adapted to be received in the socket, the slant angle of the frusto-conical end being different from the slant angle of the conical bottom wall of the socket to provide a continuous narrow annular area of contact between the hose end and socket member, and means for exerting axial pressure upon the hose end to force said hose end into the socket and against the inner sleeve to form a fluid-tight seal therebetween through said narrow annular area, said inner sleeve being longer than the outer sleeve and extending beyond the end of the outer sleeve, said hose end having a radially extending wall disposed intermediate the axially outer ends of the inner and outer sleeves, and said means for exerting axial pressure upon the hose comprising an axially split ring disposed over the hose end and abutting upon the said radially extending wall, means for clamping the split ring over the hose and the hose upon the inner sleeve, resilient means interposed between the ring and said hose, and resilient means under stress between the ring and coupling and urging the hose through the intermediary of the ring and radially extending wall into the socket, said resilient means interposed between the ring and said hose serving to absorb some of the radial pressure exerted upon the hose by the ring and thus reducing the resistance to relative axial movement between the hose and the said inner wall, whereby to insure the presence of axial pressure upon the hose as aforesaid.

References Cited in the file of this patent

UNITED STATES PATENTS

| | | |
|---|---|---|
| 291,773 | Reilly | Jan. 8, 1884 |
| 498,239 | Coignet | May 30, 1893 |
| 824,753 | Stephens | July 3, 1906 |
| 956,076 | Greenfield | Apr. 26, 1910 |
| 985,155 | Fournia | Feb. 28, 1911 |
| 1,042,852 | Boden | Oct. 29, 1912 |
| 1,498,321 | Holweck | June 17, 1924 |
| 1,571,870 | Peterson | Feb. 2, 1926 |
| 1,703,696 | Stratford | Feb. 26, 1929 |
| 1,980,451 | Taylor | Nov. 13, 1934 |
| 2,188,006 | Katcher | Jan. 23, 1940 |

(Other references on following page)

UNITED STATES PATENTS

| | | |
|---|---|---|
| 2,300,464 | Parker | Nov. 3, 1942 |
| 2,335,040 | Bruno | Nov. 23, 1943 |
| 2,366,444 | Dorman | June 2, 1945 |
| 2,457,908 | Meyerhoefer | Jan. 4, 1949 |
| 2,465,669 | Tudor | Mar. 29, 1949 |
| 2,545,263 | Corydon | Mar. 13, 1951 |
| 2,566,769 | Kay | Sept. 4, 1951 |
| 2,626,167 | Lake | Jan. 20, 1953 |
| 2,694,583 | Zitza et al. | Nov. 16, 1954 |
| 2,696,394 | Kaiser | Dec. 7, 1954 |
| 2,905,488 | Spence | Sept. 22, 1959 |

FOREIGN PATENTS

| | | |
|---|---|---|
| 178,253 | Great Britain | Apr. 20, 1922 |
| 296,176 | Great Britain | Aug. 30, 1928 |